US008412407B2

(12) United States Patent
Andrasko et al.

(10) Patent No.: US 8,412,407 B2
(45) Date of Patent: Apr. 2, 2013

(54) CALIBRATION CONTROL SYSTEMS AND METHODS

(75) Inventors: Steven J. Andrasko, Wixom, MI (US); Thomas E. Wiseman, Canton, MI (US)

(73) Assignee: GM Global Technology Operations LLC

( * ) Notice: Subject to any disclaimer, the term of this patent is extended or adjusted under 35 U.S.C. 154(b) by 323 days.

(21) Appl. No.: 12/883,524

(22) Filed: Sep. 16, 2010

(65) Prior Publication Data

US 2012/0072090 A1 Mar. 22, 2012

(51) Int. Cl.
*G06F 19/00* (2006.01)

(52) U.S. Cl. ........................................ 701/33.1; 701/99

(58) Field of Classification Search ........................ None
See application file for complete search history.

(56) References Cited

U.S. PATENT DOCUMENTS 6,529,805 B2 * 3/2003 Aldrich et al. .................... 701/1
2004/0249558 A1 * 12/2004 Meaney ........................ 701/115
2006/0047381 A1 * 3/2006 Nguyen .......................... 701/29

* cited by examiner

*Primary Examiner* — Michael J. Zanelli

(57) ABSTRACT

A base determination module determines a base value based on a base value input. A compensation determination module determines a base compensation value based on a base value input. A compensation coefficient determination module determines a compensation coefficient based on a compensation coefficient input. A multiplier module determines a compensation value based on a product of the base compensation value and the compensation coefficient. A target module determines a target value based on the base value and the compensation value and controls an actuator based on the target value. A calibration module selectively displays predetermined options for calibrating one of the base compensation value input and the compensation coefficient input and sets the one of the base compensation value input and the compensation coefficient input to a selected one of the predetermined options.

19 Claims, 9 Drawing Sheets

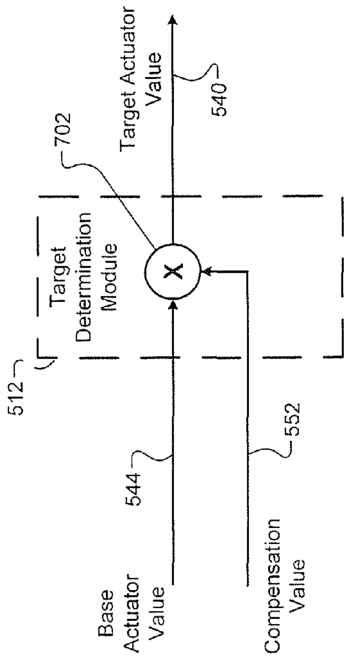
FIG. 7B
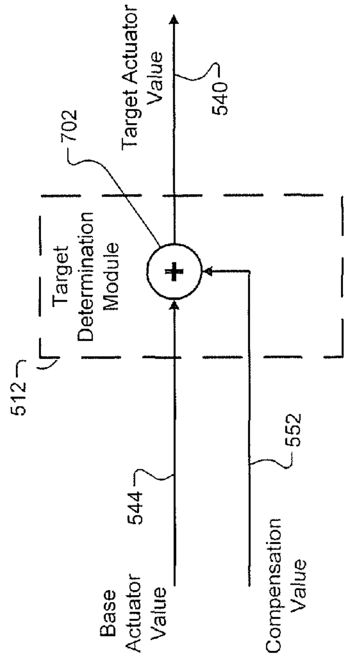
FIG. 7C
FIG. 7A
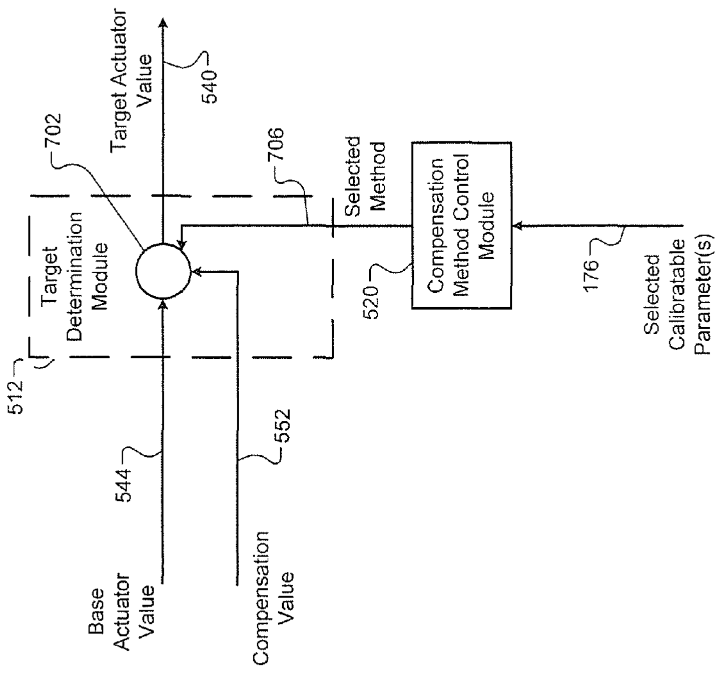

CALIBRATION CONTROL SYSTEMS AND METHODS

FIELD

The present disclosure relates to vehicles and more particularly to calibration systems and methods for vehicle control modules.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Air is drawn into an engine through an intake manifold. A throttle valve controls airflow into the engine. The air mixes with fuel from one or more fuel injectors to form an air/fuel mixture. The air/fuel mixture is combusted within one or more cylinders of the engine. Combustion of the air/fuel mixture generates torque.

An engine control module (ECM) controls the engine. More specifically, the ECM may control one or more engine actuators based on target actuator values, respectively, to achieve a target amount of torque. The ECM may determine a given target actuator value based on a base actuator value and a compensation value. The ECM may determine the compensation value based on one or more inputs and one or more functions and/or mappings that relate the one or more inputs to the compensation value. The ECM may determine the target actuator value based on the base actuator value and the compensation value.

SUMMARY

A control module calibration system for a vehicle includes a control module and a calibration module. The control module determines a base actuator value based on a base actuator value input, determines a compensation value based on a compensation value input, determines a target actuator value based on the base actuator value, the compensation value, and a function for determining the target actuator value based on the base actuator value and the compensation value, and controls an actuator based on the target actuator value. The calibration module displays predetermined options for calibrating the function to a user and selectively sets the function to a selected one of the predetermined options.

A control module calibration system for a vehicle includes a base determination module, a compensation determination module, a compensation coefficient determination module, a multiplier module, a target module, and a calibration module. The base determination module determines a base value based on a base value input. The compensation determination module determines a base compensation value based on a base value input. The compensation coefficient determination module determines a compensation coefficient based on a compensation coefficient input. The multiplier module determines a compensation value based on a product of the base compensation value and the compensation coefficient. The target module determines a target value based on the base value and the compensation value and controls an actuator based on the target value. The calibration module selectively displays predetermined options for calibrating one of the base compensation value input and the compensation coefficient input and sets the one of the base compensation value input and the compensation coefficient input to a selected one of the predetermined options.

A control module calibration method includes: determining a base actuator value based on a base actuator value input using a control module; determining a compensation value based on a compensation value input using the control module; determining a target actuator value based on the base actuator value, the compensation value, and a function for determining the target actuator value based on the base actuator value and the compensation value using the control module; controlling an actuator based on the target actuator value using the control module; displaying predetermined options for calibrating the function to a user; and selectively setting the function to a selected one of the predetermined options.

In still other features, the systems and methods described above are implemented by a computer program executed by one or more processors. The computer program can reside on a tangible computer readable medium such as but not limited to memory, nonvolatile data storage, and/or other suitable tangible storage mediums.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIGS. 7A-7C are functional block diagrams of exemplary target determination modules according to the principles of the present disclosure;

DETAILED DESCRIPTION

Figure 1:
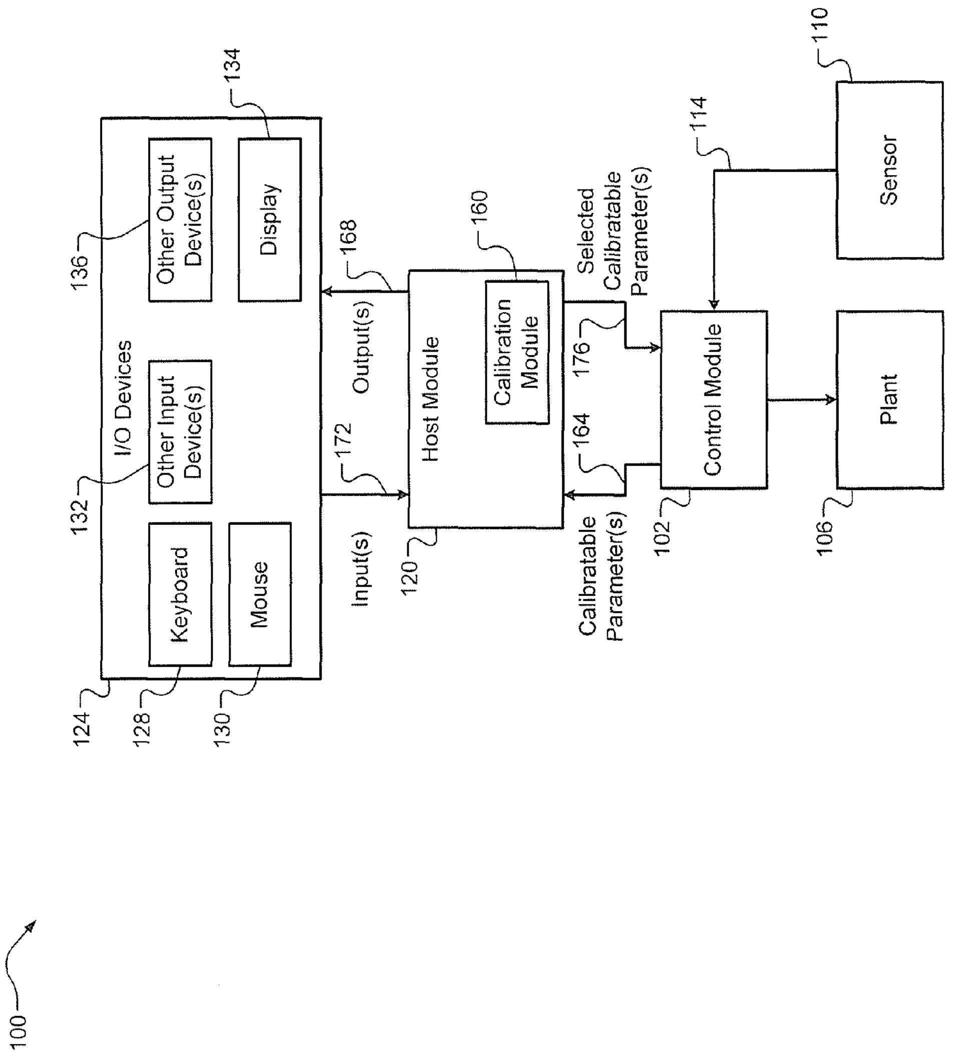
FIG. 1 is a functional block diagram of an exemplary control module calibration system according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

A control module, such as an engine control module, controls one or more actuators. More specifically, the control module determines a target actuator value for a given actuator and controls the actuator to achieve the target actuator value. The control module determines the target actuator value based on a base actuator value and a compensation value. More specifically, the control module sets the target actuator value equal to either a sum of the base actuator value and the compensation value or a product of the base actuator value and the compensation value. Whether the control module sets the target actuator value equal to the sum or the product is predetermined.

While the present disclosure will be discussed as it relates to actuator values, the principles of the present disclosure are also applicable to target parameter values, such as a target manifold pressure, a target rail pressure target, a target intake air parameter, and other suitable target parameter values.

The control module determines the compensation value based on a base compensation value and a compensation coefficient. More specifically, the control module may set the compensation value equal to a product of the base compensation value and the compensation coefficient. The control module determines the base compensation value based on one or more predetermined inputs and one or more predetermined functions and/or mappings that relate the predetermined input (s) to the base compensation value. The control module determines the compensation coefficient based on one or more predetermined inputs and one or more predetermined functions and/or mappings that relate the predetermined inputs to the compensation coefficient.

A calibrator or another suitable user selects the one or more inputs that the control module will use in determining the base compensation value during a design phase of the control module. The calibrator also selects the one or more inputs that the control module will use in determining the compensation coefficient during the design phase. The calibrator also selects whether the control module will set the target actuator value equal to the sum or the product during the design phase. Based on the selections, the calibrator calibrates the functions and/or mappings during the design phase.

Changing one or more of the inputs and/or changing whether the control module sets the target actuator value equal to the sum or the product may enable the control module to control the actuator in a more desirable manner in some circumstances. However, changing the control module (e.g., the software) may be necessary to implement the change. Implementing one or more changes to the control module may lead to downtime for the calibrator, may entail capital expenditure, etc. A calibration module of the present disclosure enables the calibrator to change one or more of the one or more inputs and/or to change whether the control module sets the target actuator value equal to the sum or the product.

Referring now to FIG. 1, a functional block diagram of an exemplary control module calibration system 100 is presented. A control module 102 controls a plant 106. One or more sensors, such as sensor 110, measure parameters, respectively, related to controlling the plant 106. The sensors provide signals, such as signal 114, to the control module 102 based on the measured parameters, respectively. The control module 102 may control the plant 106 based on one or more of the signals.

While not shown in FIG. 1, the plant 106 may include one or more actuators that collectively control operation of the plant 106. The control module 102 may determine one or more target actuator values and control the one or more actuators based on the one or more target actuator values, respectively (e.g., see FIG. 5).

The control module 102 may determine a given one of the target actuator values based on a base actuator value and a compensation value. For example only, the control module 102 may set the target actuator value equal to a sum of the base actuator value and the compensation value or equal to a product of the base actuator value and the compensation value.

The control module 102 determines the base actuator value using one or more base actuator value functions and/or mappings that relate one or more base actuator value inputs to the base actuator value. The control module 102 determines the compensation value using one or more compensation value functions and/or mappings that relate one or more compensation value inputs to the compensation value.

The control module 102 determines the compensation value based on a base compensation value and a compensation coefficient. The control module 102 may determine the base compensation value using one or more base compensation value functions and/or mappings that relate one or more base compensation value inputs to the base compensation value. The control module 102 may determine the compensation coefficient based on one or more compensation coefficient functions and/or mappings that relate one or more compensation coefficient inputs to the compensation coefficient. The control module 102 may set the compensation value equal to a product of the base compensation value and the compensation coefficient.

A calibrating engineer or another suitable user (hereafter "the calibrator") may calibrate how the control module 102 determines the target actuator values. The calibrator may perform the calibration during a design phase of the control module 102. For example only, regarding the determination of the given target actuator value, the calibrator sets whether the control module 102 will set the given target actuator value equal to the sum of or to the product of the base actuator value and the compensation value. The calibrator also sets one or more of a plurality of available inputs that the control module 102 will use to determine the base compensation value. The calibrator also sets one or more of the available inputs that the control module 102 will use to determine the compensation coefficient.

The calibrator may calibrate the determination of the target actuator values using a host module 120 and one or more input/output (I/O) devices 124. The host module 120 may interface the control module 102 via a bus (not shown). The interface may be a wireless interface or a wired interface. Input devices of the I/O devices 124 may include, for example, a keyboard 128, a mouse 130, and/or one or more other suitable input devices 132. Output devices of the I/O devices 124 may include, for example, a display 134 and/or one or more other suitable output devices 136.

The host module 120 may include a calibration module 160. The calibration module 160 may receive parameters from the control module 102 that are to be calibrated by the calibrator. Collectively, the parameters that are to be calibrated (i.e., set) by the calibrator may be referred to as calibratable parameters 164. The calibration module 160 may also receive other data from the control module 102. The calibration module 160 may generate outputs 168 to display the calibratable parameters 164 to the calibrator via one or more of the output devices.

The calibrator calibrates the calibratable parameters 164. More specifically, the calibrator selects ones of sets of predetermined options for the calibratable parameters 164, respectively, via one or more of the input devices. The one or more input devices generate inputs 172 to communicate the calibrator's selections to the calibration module 160. The selected ones of the calibratable parameters 164 may be collectively referred to as selected calibratable parameters 176.

For each of the target actuator values, the selected calibratable parameters 176 may include whether the control module 102 should set the target actuator values equal to the sum of or to the product of the base actuator values and the compensation values, respectively. The selected calibratable parameters 176 may also include one or more of the available inputs that the control module 102 should use to determine the base compensation values for the target actuator values, respectively. The selected calibratable parameters 176 may also include one or more of the available inputs the control module 102 should use to determine the compensation coefficients for the target actuator values, respectively.

The calibration module 160 selectively stores the selected calibratable parameters 176 in the control module 102. For example only, the calibration module 160 may update the calibratable parameters 164 to reflect the selected calibratable parameters 176, respectively. When controlling the plant 106 (via the actuators), the control module 102 determines the target actuator values based on the selected calibratable parameters 176.

The plant 106 may include, for example, an engine of a vehicle, a transmission of a vehicle, or another suitable type of plant of a vehicle. For example only, an exemplary engine system 200 is presented in FIG. 2.

Figure 2:
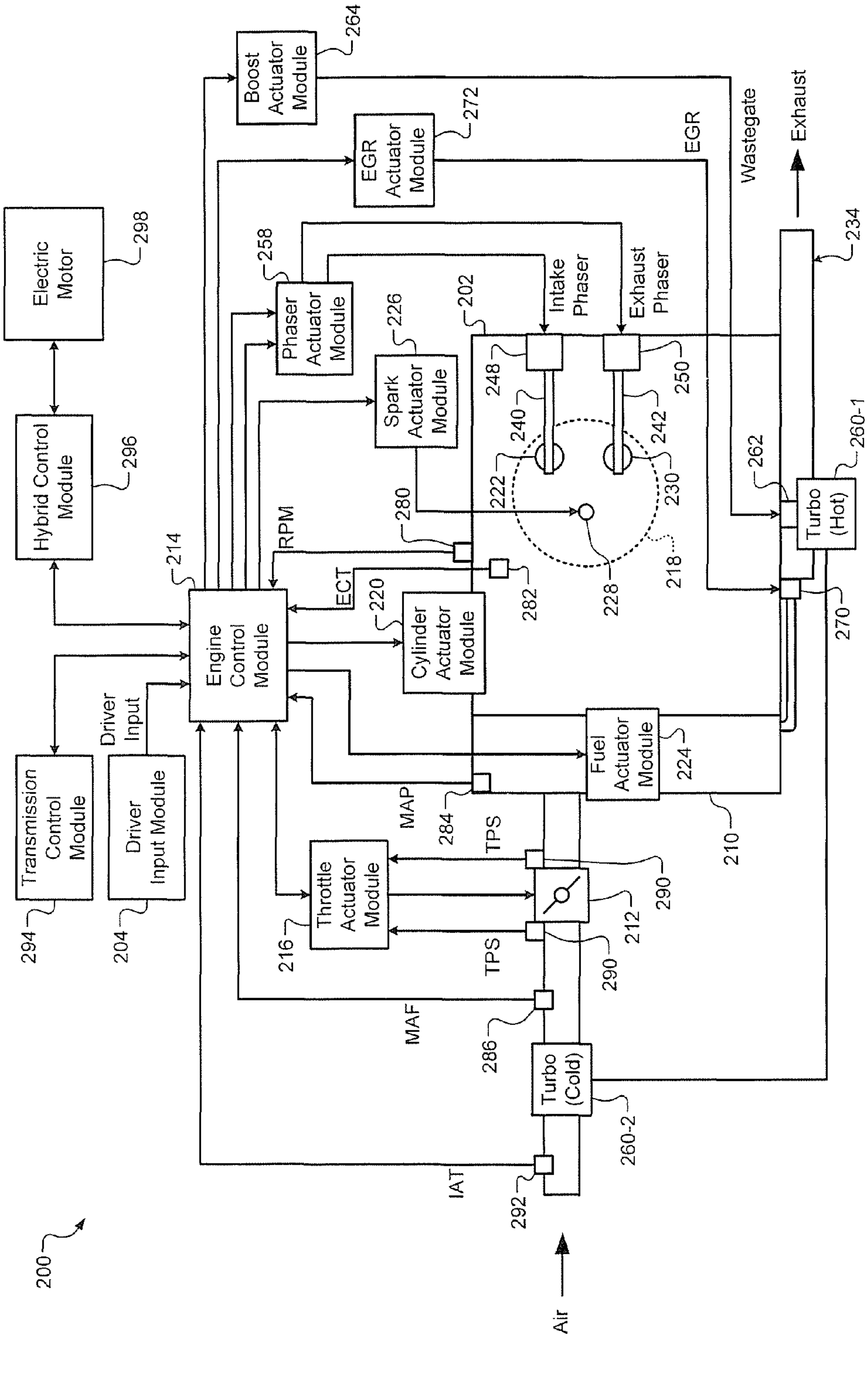
FIG. 2 is a functional block diagram of an exemplary engine system according to the principles of the present disclosure.

Referring now to FIG. 2, an exemplary functional block diagram of the engine system 200 is presented. The engine system 200 includes an engine 202 that combusts an air/fuel mixture to produce drive torque for a vehicle based on a driver input from a driver input module 204. Air is drawn into an intake manifold 210 through a throttle valve 212. An engine control module (ECM) 214 controls a throttle actuator module 216, which regulates opening of the throttle valve 212 to control the amount of air drawn into the intake manifold 210.

Air from the intake manifold 210 is drawn into cylinders of the engine 202. While the engine 202 may include multiple cylinders, for illustration purposes only, a single representative cylinder 218 is shown. For example only, the engine 202 may include 2, 3, 4, 5, 6, 8, 10, and/or 12 cylinders. The ECM 214 may instruct a cylinder actuator module 220 to selectively deactivate some of the cylinders, which may improve fuel economy under certain engine operating conditions.

The engine 202 may operate using a four-stroke cycle. The four strokes, described below, are named the intake stroke, the compression stroke, the combustion stroke, and the exhaust stroke. During each revolution of a crankshaft (not shown), two of the four strokes occur within the cylinder 218. Therefore, two crankshaft revolutions are necessary for the cylinder 218 to experience all four of the strokes.

During the intake stroke, air from the intake manifold 210 is drawn into the cylinder 218 through an intake valve 222. The ECM 214 controls a fuel actuator module 224, which regulates fuel injection to achieve a desired air/fuel ratio. Fuel may be injected into the intake manifold 210 at a central location or at multiple locations, such as near the intake valve 222 of each of the cylinders. In various implementations (not shown), fuel may be injected directly into the cylinders or into mixing chambers associated with the cylinders. The fuel actuator module 224 may halt injection of fuel to cylinders that are deactivated.

The injected fuel mixes with air and creates an air/fuel mixture in the cylinder 218. During the compression stroke, a piston (not shown) within the cylinder 218 compresses the air/fuel mixture. The engine 202 may be a compression-ignition engine, in which case heat generated via compression ignites the air/fuel mixture within the cylinder 218. Alternatively, the engine 202 may be a spark-ignition engine as shown in FIG. 1, in which case a spark actuator module 226 energizes a spark plug 228 in the cylinder 218 based on a signal from the ECM 214. The timing of the spark may be specified relative to the time when the piston is at its topmost position, referred to as top dead center (TDC).

The spark actuator module 226 may be controlled by a timing signal specifying how far before or after TDC to generate the spark. Because piston position is directly related to crankshaft rotation, operation of the spark actuator module 226 may be synchronized with crankshaft angle. In various implementations, the spark actuator module 226 may halt provision of spark to deactivated cylinders.

During the combustion stroke, the combustion of the air/fuel mixture drives the piston down, thereby driving the crankshaft. The combustion stroke may be defined as the time between the piston reaching TDC and the time at which the piston returns to bottom dead center (BDC).

During the exhaust stroke, the piston begins moving up from BDC and expels the byproducts of combustion through an exhaust valve 230. The byproducts of combustion are exhausted from the vehicle via an exhaust system 234.

The intake valve 222 may be controlled by an intake camshaft 240, while the exhaust valve 230 may be controlled by an exhaust camshaft 242. In various implementations, multiple intake camshafts (including the intake camshaft 240) may control multiple intake valves (including the intake valve 222) for the cylinder 218 and/or may control the intake valves (including the intake valve 222) of multiple banks of cylinders (including the cylinder 218). Similarly, multiple exhaust camshafts (including the exhaust camshaft 242) may control multiple exhaust valves for the cylinder 218 and/or may control exhaust valves (including the exhaust valve 230) for multiple banks of cylinders (including the cylinder 218).

The cylinder actuator module 220 may deactivate the cylinder 218 by disabling opening of the intake valve 222 and/or the exhaust valve 230. In various other implementations, the intake valve 222 and/or the exhaust valve 230 may be controlled by devices other than camshafts, such as electromagnetic actuators.

The time at which the intake valve 222 is opened may be varied with respect to piston TDC by an intake cam phaser 248. The time at which the exhaust valve 230 is opened may be varied with respect to piston TDC by an exhaust cam phaser 250. A phaser actuator module 258 may control the intake cam phaser 248 and the exhaust cam phaser 250 based on signals from the ECM 214. When implemented, variable valve lift (not shown) may also be controlled by the phaser actuator module 258.

The engine system 200 may include a boost device that provides pressurized air to the intake manifold 210. For example, FIG. 2 shows a turbocharger including a hot turbine 260-1 that is powered by hot exhaust gases flowing through the exhaust system 234. The turbocharger also includes a cold air compressor 260-2, driven by the turbine 260-1, that compresses air leading into the throttle valve 212. In various implementations, a supercharger (not shown), driven by the crankshaft, may compress air from the throttle valve 212 and deliver the compressed air to the intake manifold 210.

A wastegate 262 may allow exhaust to bypass the turbine 260-1, thereby reducing the boost (the amount of intake air compression) provided by the turbocharger. The ECM 214 may control the boost device via a boost actuator module 264. For example only, the boost actuator module 264 may modulate the boost of the turbocharger by controlling the position of the wastegate 262. In various implementations, multiple turbochargers may be controlled by the boost actuator module 264. The turbocharger may have variable geometry, which may be controlled by the boost actuator module 264.

An intercooler (not shown) may dissipate some of the heat contained in the compressed air charge, which is generated as the air is compressed. The compressed air charge may also have absorbed heat from components of the exhaust system 234. Although shown separated for purposes of illustration, the turbine 260-1 and the compressor 260-2 may be attached to each other, placing intake air in close proximity to hot exhaust.

The engine system 200 may include an exhaust gas recirculation (EGR) valve 270, which selectively redirects exhaust gas back to the intake manifold 210. The EGR valve 270 may be located upstream of the turbocharger's turbine 260-1. The EGR valve 270 may be controlled by an EGR actuator module 272.

The engine system 200 may measure the speed of the crankshaft in revolutions per minute (RPM) using an RPM sensor 280. The temperature of the engine coolant may be measured using an engine coolant temperature (ECT) sensor 282. The ECT sensor 282 may be located within the engine 202 or at other locations where the coolant is circulated, such as a radiator (not shown).

The pressure within the intake manifold 210 may be measured using a manifold absolute pressure (MAP) sensor 284. In various implementations, engine vacuum, which is the difference between ambient air pressure and the pressure within the intake manifold 210, may be measured. The mass flow rate of air flowing into the intake manifold 210 may be measured using a mass air flowrate (MAF) sensor 286. In various implementations, the MAF sensor 286 may be located in a housing that also includes the throttle valve 212.

The throttle actuator module 216 may monitor the position of the throttle valve 212 using one or more throttle position sensors (TPS) 290. The ambient temperature of air being drawn into the engine 202 may be measured using an intake air temperature (IAT) sensor 292. The ECM 214 may use signals from the sensors to make control decisions for the engine system 200.

The ECM 214 may communicate with a transmission control module 294 to coordinate shifting gears in a transmission (not shown). For example, the ECM 214 may reduce engine torque during a gear shift. The ECM 214 may communicate with a hybrid control module 296 to coordinate operation of the engine 202 and an electric motor 298.

The electric motor 298 may also function as a generator, and may be used to produce electrical energy for use by vehicle electrical systems and/or for storage in a battery. In various implementations, various functions of the ECM 214, the transmission control module 294, and the hybrid control module 296 may be integrated into one or more modules.

Each system that varies an engine parameter may be referred to as an actuator, and each actuator receives a target actuator value. For example, the throttle actuator module 216 may be referred to as an actuator and the throttle opening area may be referred to as the target actuator value. In the example of FIG. 2, the throttle actuator module 216 may achieve the throttle opening area (i.e., the target actuator value) by adjusting an angle of a blade of the throttle valve 212.

Similarly, the spark actuator module 226 may be referred to as an actuator, while the corresponding target actuator value may refer to the spark timing. Other actuators may include the cylinder actuator module 220, the fuel actuator module 224, the phaser actuator module 258, the boost actuator module 264, and the EGR actuator module 272. For these actuators, the target actuator values may correspond to number of activated cylinders, fueling rate, intake and exhaust cam phaser angles, boost pressure, and EGR valve opening area, respectively. The ECM 214 may control the target actuator values in order to cause the engine 202 to generate a target engine output torque.

Figure 3:
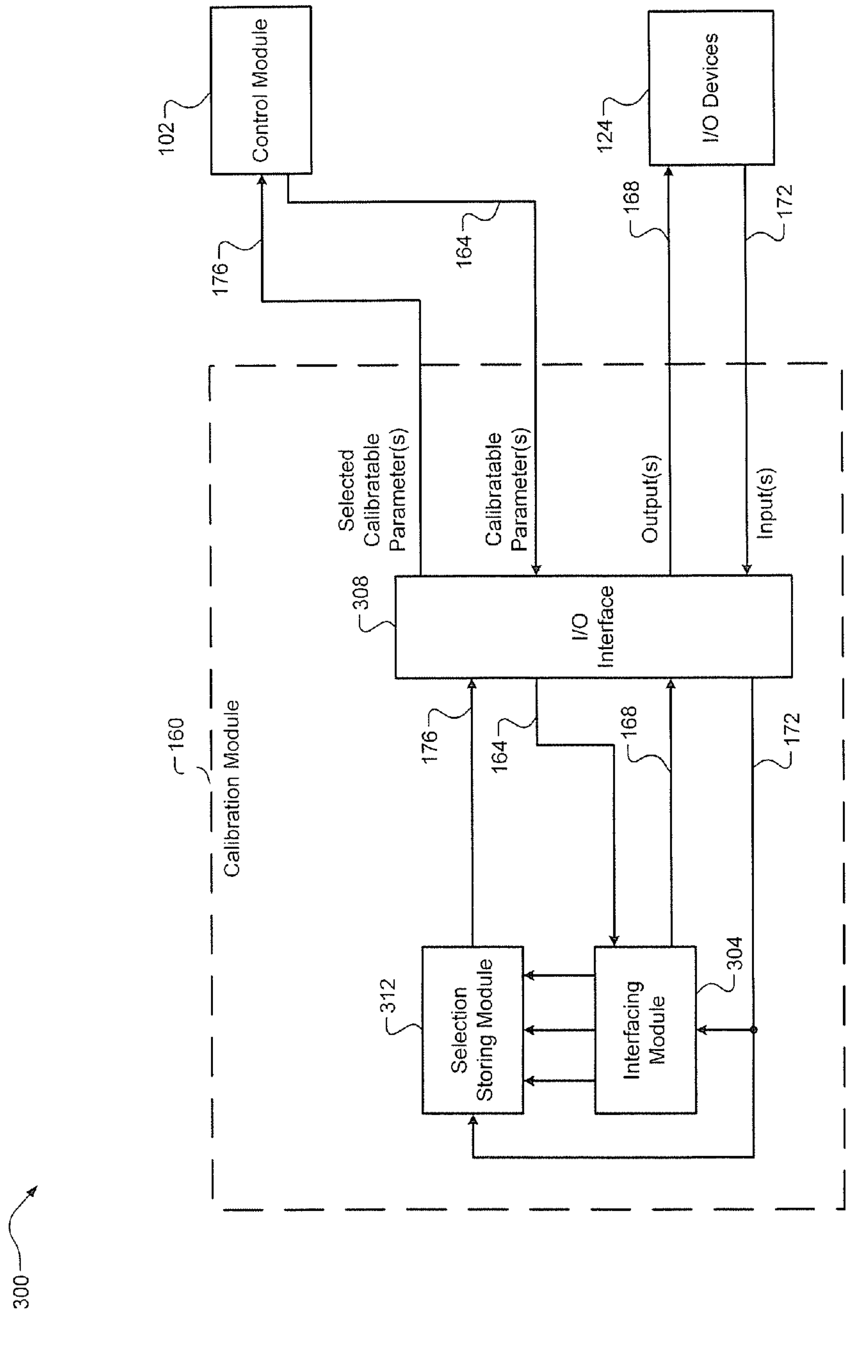
FIG. 3 is a functional block diagram of an exemplary calibration system according to the principles of the present disclosure.

Referring now to FIG. 3, a functional block diagram of an exemplary calibration system 300 is presented. The calibration module 160 may include an interfacing module 304, an input/output (I/O) interface 308, and a selection storing module 312.

The interfacing module 304 serves as a communication interface between the control module 102 and the calibrator. The interfacing module 304 selectively retrieves the calibratable parameters 164 from the control module 102 via the I/O interface 308. For example only, the interfacing module 304 may retrieve the calibratable parameters 164 when the host module 120 executes a calibration program.

The interfacing module 304 generates the outputs 168 to display the calibratable parameters 164. One or more of the output devices, such as the display 134, displays the calibratable parameters 164 based on the outputs 168. The interfacing module 304 may generate the outputs 168 to display the calibratable parameters 164 in a predetermined format. For example only, the interfacing module 304 may generate the outputs 168 to display the calibratable parameters 164 in a graphical user interface (GUI) having a predetermined format.

Figure 4:
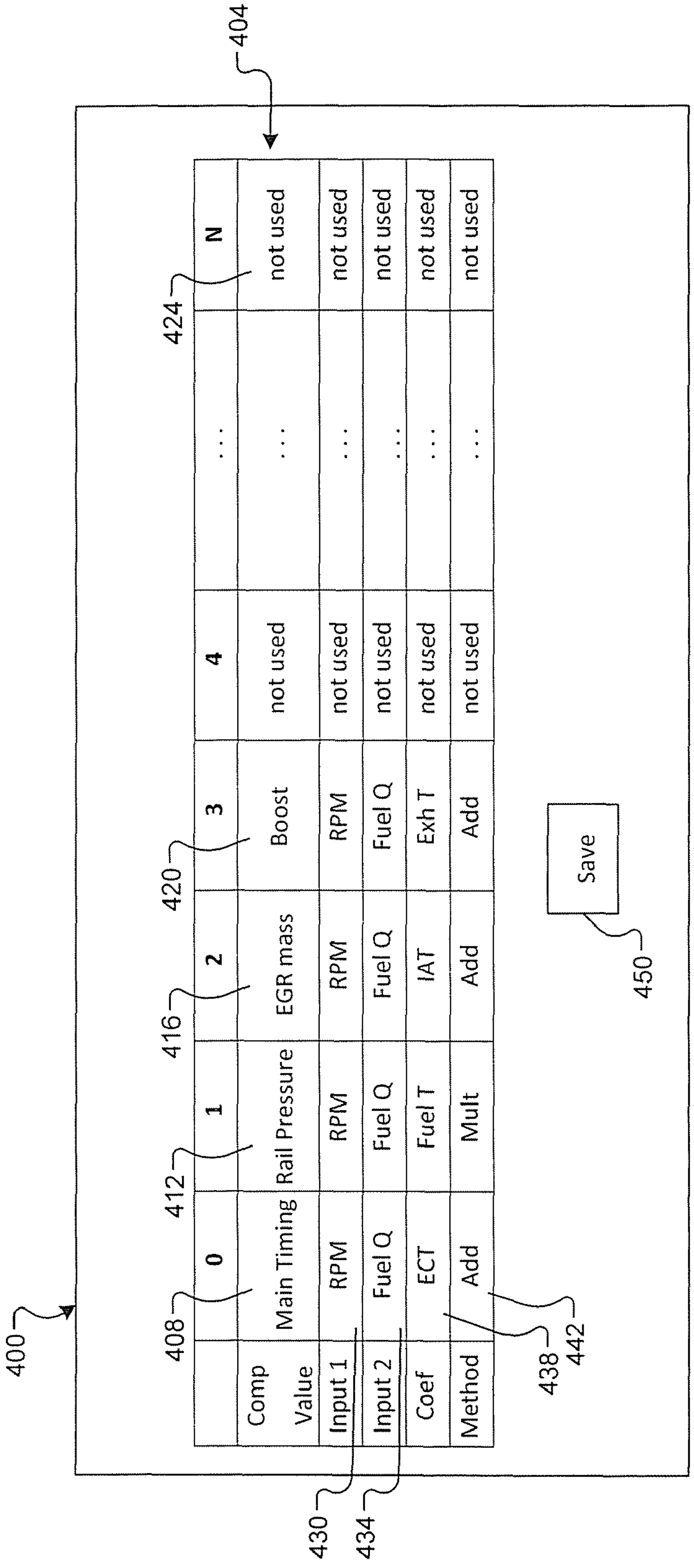
FIG. 4 is an exemplary illustration of a calibration graphical user interface (GUI) according to the principles of the present disclosure.

Referring now to FIG. 4, an illustration of an exemplary calibration GUI 400 is presented. With continuing reference to FIG. 3, the interfacing module 304 may populate fields of the calibration GUI 400 with retrieved data for the calibratable parameters 164.

The interfacing module 304 may populate a variable name row 404 with names of compensation values (or the base or target actuator values) for which the calibrator may calibrate one or more of the calibratable parameters 164. The variable name row 404 may include N variable name fields, such as variable name field 408, variable name field 412, variable name field 416, and variable name field 420, where N is an integer greater than 0.

Each of the variable name fields corresponds to a compensation value that is associated with one of the target actuator values. For example only, the variable name field 408 may correspond to a compensation value used in determining a target main timing value, and the variable name field 412 may correspond to a compensation value used in determining a target rail pressure value. The variable name field 416 may correspond to a compensation value used in determining a target EGR mass value, and the variable name field 420 may correspond to a compensation value used in determining a target boost value.

The target main timing value may be used to control when a main (or primary) injection of fuel is supplied to a cylinder of an engine. The target rail pressure value may be used to control a fuel pump that regulates pressure of fuel within a fuel rail (not shown) that provides fuel to fuel injector(s) of an engine. The target EGR mass value may be used to control a mass flow rate of exhaust gas being recirculated back to an engine. The target boost value may be used to control an amount of boost provided by a boost device associated with an engine.

The interfacing module 304 populates P input fields, a coefficient input fields, and a method field associated with each of the variable name fields, where P is an integer greater than 1. For example only, the interfacing module 304 may populate first and second input fields 430 and 434, a coefficient input field 438, and a method field 442 associated with the variable name field 408. The interfacing module 304 may also populate one or more other coefficient input fields associated with one or more of the variable name fields. Initially, the interfacing module 304 may populate the input fields, the coefficient input fields, and the method fields with a predetermined message. For example only, the predetermined message may be "not used," as in the variable name fields 420 and 424.

The input fields, the coefficient input field, and the method field associated with each of the compensation values are selectable. The calibrator may select a given one of the selectable fields via one of the input devices, such as the mouse 130. For example only, the calibrator may select a given one of the selectable fields by clicking (e.g., left clicking) on the given one of the selectable fields. Each of the selectable fields corresponds to one of the calibratable parameters 164.

When one of the selectable fields is selected, the interfacing module 304 may generate a drop-down list with a set of predetermined options for the selected one of the selectable fields. The predetermined options for each of the selectable input fields may be, for example, retrieved from the control module 102.

In the example of FIG. 4, engine speed and fuel quantity have been selected from the sets of predetermined options for the first and second input fields 430 and 434, respectively. In this manner, the base compensation value for the target main timing value will be determined using the engine speed and the fuel quantity as the base compensation value inputs.

Coolant temperature and additive have been selected from the predetermined options for the coefficient input field 438 and the method field 442, respectively. The compensation coefficient for the target main timing value will be determined using the coolant temperature as the compensation coefficient input. The control module 102 will determine the compensation value for the target main timing based on the product of the base compensation value and the compensation coefficient. When addition has been selected from the method field 442, the control module 102 may set the target main timing value equal to a sum of the base main timing value and the compensation value. When multiplication has been selected from the method field 442, the control module 102 may set the target main timing value equal to a product of the base main timing value and the compensation value.

The predetermined message may be one of the predetermined options for each of the selectable fields. For example only, the predetermined message may be one of the predetermined options for the first and second input fields 430 and 434, the coefficient input field 438, and the method field 442. The calibrator may select the predetermined message from one of the first and second input fields 430 and 434, for example, to limit the number of inputs used in determining the base compensation value for the target main timing value. When the predetermined message is selected from a given one of the method fields, the interfacing module 304 may set the associated input fields and the associated coefficient input field to the predetermined message. When the predetermined message is selected from a given one of the methods fields, the associated compensation value may be disabled or the associated compensation value may be otherwise disregarded in determining the target actuator value. The calibratable parameters 164, as selected in the calibration GUI 400, may correspond to the selected calibratable parameters 176.

The selection storing module 312 selectively stores the selected calibratable parameters 176 in the control module 102. The selection storing module 312 may, for example, selectively update the calibratable parameters 164 to reflect the selected calibratable parameters 176. The selection storing module 312 may retrieve the calibrator's selections and store the selected calibratable parameters 176, for example, when the calibrator inputs a save command. For example only, the calibrator may input a save command by clicking (e.g., left clicking) a save option 450 of the calibration GUI 400.

Figure 5:
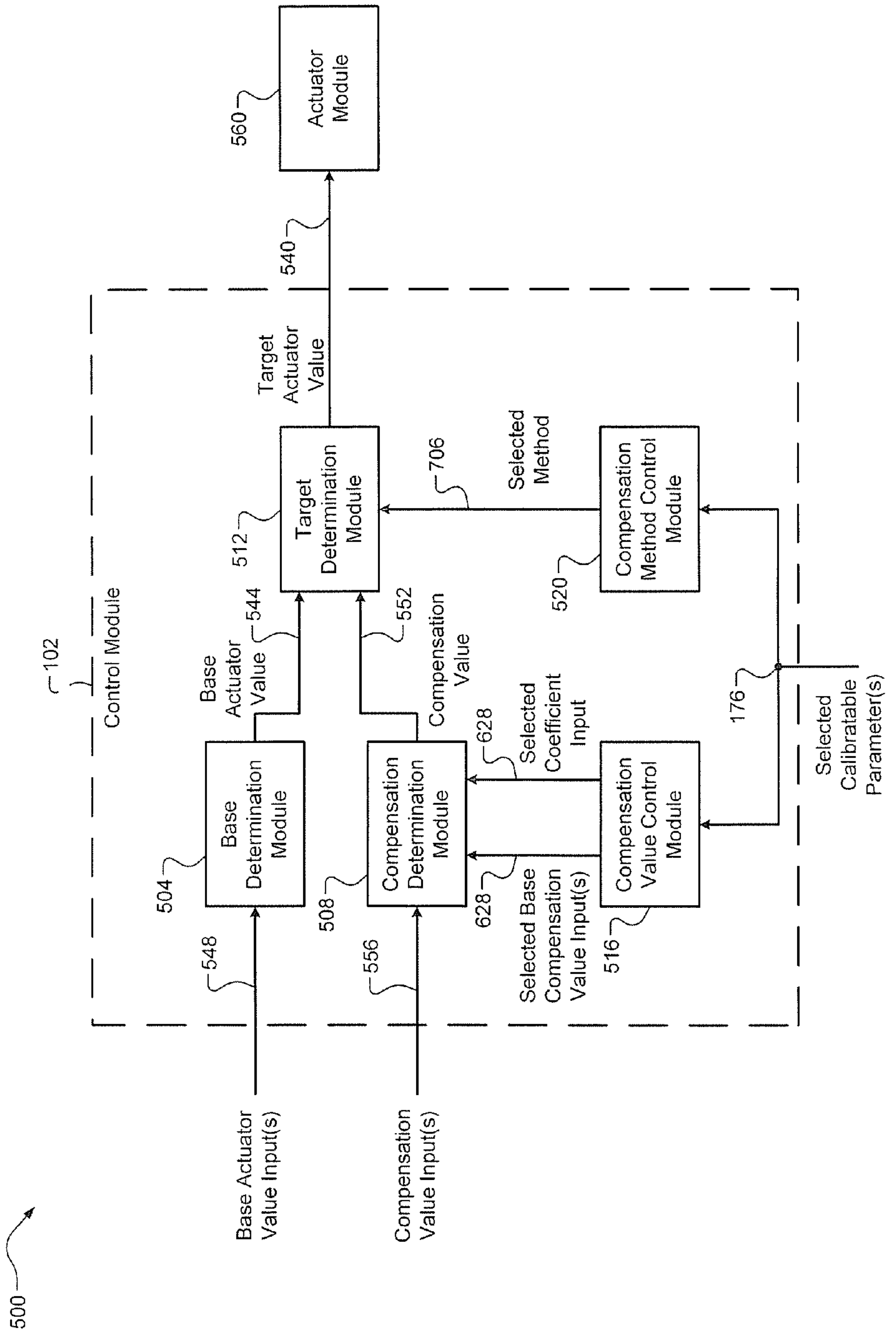
FIG. 5 is an exemplary functional block diagram of an exemplary actuator control system according to the principles of the present disclosure.

Referring now to FIG. 5, a functional block diagram of an exemplary actuator control system 500 is presented. The control module 102 may include a base determination module 504, a compensation determination module 508, a target determination module 512, a compensation value control module 516, and a compensation method control module 520.

Regarding the determination of a given one of the target actuator values 540, the base determination module 504 determines a base actuator value 544 based on one or more base actuator value inputs 548. For example only, the base determination module 504 may determine the base actuator value 544 using one or more base actuator value functions and/or mappings that relate the one or more base actuator value inputs 548 to the base actuator value 544. The base determination module 504 provides the base actuator value 544 to the target determination module 512.

The compensation determination module 508 determines a compensation value 552 for the target actuator value 540 based on one or more compensation value inputs 556. The compensation value inputs 556 may include one or more base compensation value inputs (e.g., see FIG. 6) and one or more compensation coefficient inputs (e.g., see FIG. 6). The compensation determination module 508 selects the compensation value inputs 556 from a plurality of available inputs (not shown) based on the selected calibratable parameters 176.

Figure 6:
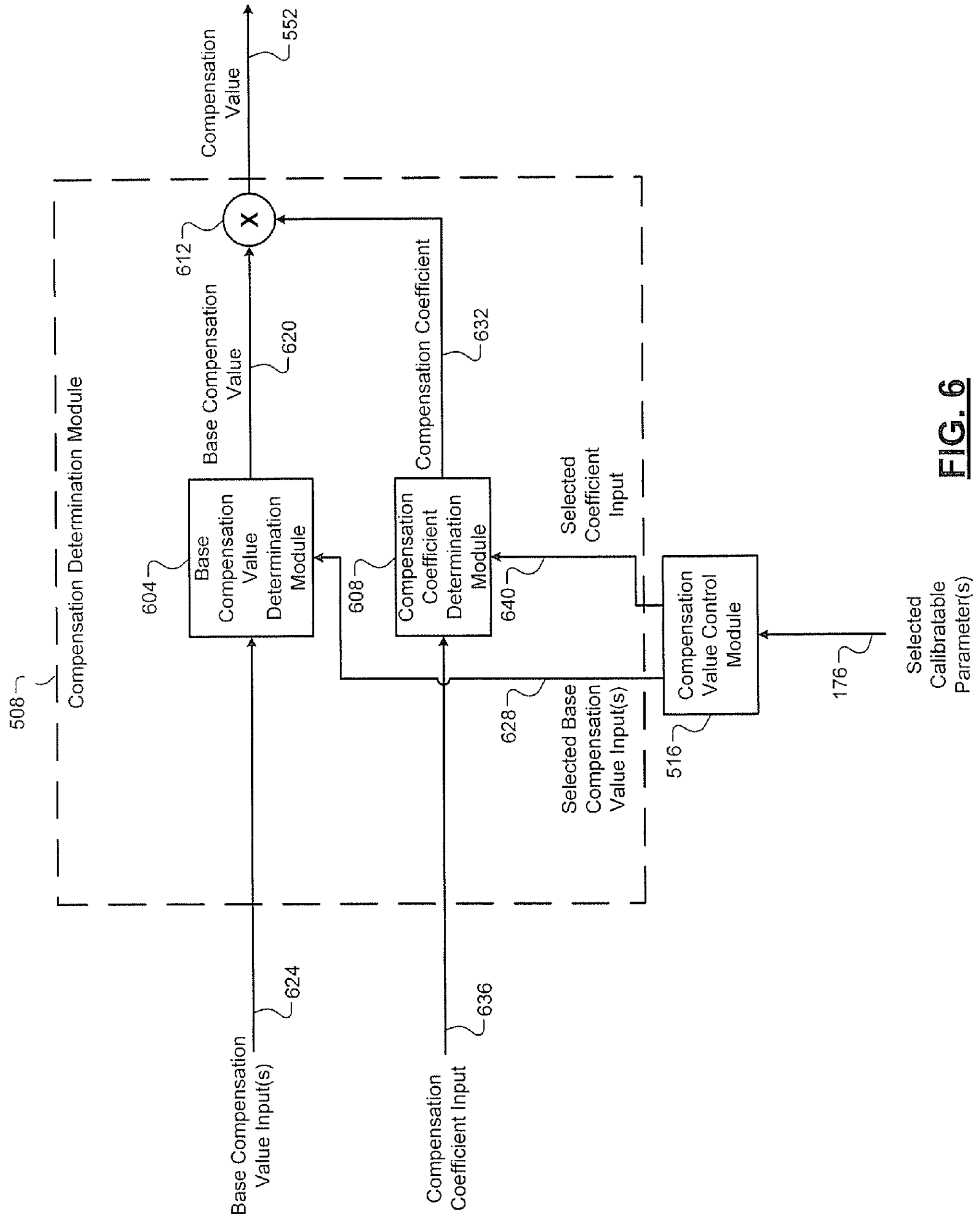
FIG. 6 is a functional block diagram of an exemplary compensation determination module according to the principles of the present disclosure.

Referring now to FIG. 6, an exemplary functional block diagram of the compensation determination module 508 is presented. With continuing reference to FIG. 5, the compensation determination module 508 may include a base compensation value determination module 604, a compensation coefficient determination module 608, and a multiplier module 612.

The base compensation value determination module 604 determines a base compensation value 620 based on one or more base compensation value inputs 624. For example only, the base compensation value determination module 604 may determine the base compensation value 620 using one or more base compensation value functions and/or mappings that relate the one or more base compensation value inputs 624 to the base compensation value 620.

The base compensation value determination module 604 selects the one or more base compensation value inputs 624 from the plurality of available inputs. The base compensation value determination module 604 may make the selection according to selected base compensation value inputs 628. The compensation value control module 516 may generate the selected base compensation value inputs 628 based on the selected calibratable parameters 176.

The compensation coefficient determination module 608 determines a compensation coefficient 632 based on a compensation coefficient input 636. For example only, the compensation coefficient determination module 608 may determine the compensation coefficient 632 using one or more compensation coefficient functions and/or mappings that relate the compensation coefficient input 636 to the compensation coefficient 632. In various implementations, the compensation coefficient 632 may be a value between 0.0 and 1.0, inclusive. When the predetermined message is selected from the predetermined options for the method field associated with the compensation value 552, the compensation coefficient 632 may be set to 0.0.

The compensation coefficient determination module 608 selects the compensation coefficient input 636 from the plurality of available inputs. The compensation coefficient determination module 608 may make the selection according to a selected coefficient input 640. The compensation value control module 516 may generate the selected coefficient input 640 based on the selected calibratable parameters 176.

The multiplier module 612 receives the base compensation value 620 and the compensation coefficient 632. The multiplier module 612 determines the compensation value 552 for the target actuator value 540 based on the base compensation value 620 and the compensation coefficient 632. More specifically, the multiplier module 612 may set the compensation value 552 equal to a product of the compensation coefficient 632 and the base compensation value 620.

Referring now to FIGS. 7A-7C, exemplary functional block diagrams of the target determination module 512 are presented. With continuing reference to FIG. 5, the target determination module 512 may include a determination module 702. The determination module 702 determines the target actuator value 540 based on the base actuator value 544 and the compensation value 552.

The determination module 702 determines the target actuator value 540 further based on a selected method 706 for determining the target actuator value 540. The compensation method control module 520 sets the selected method 706 according to the selected calibratable parameters 176. More specifically, the compensation method control module 520 sets the selected method 706 to indicate one of addition or multiplication based on the selected calibratable parameters 176.

When the selected method 706 indicates multiplication, the determination module 702 may set the target actuator value 540 equal to the product of the base actuator value 544 and the compensation value 552. An exemplary illustration of setting the target actuator value 540 equal to the product of the base actuator value 544 and the compensation value 552 is shown in FIG. 7B.

When the selected method 706 indicates addition, the determination module 702 may set the target actuator value 540 equal to the sum of the base actuator value 544 and the compensation value 552. An exemplary illustration of setting the target actuator value 540 equal to the sum of the base actuator value 544 and the compensation value 552 is shown in FIG. 7C.

Referring again to FIG. 5, the target determination module 512 provides the target actuator value 540 to an actuator module 560 of the plant 106. The actuator module 560 controls the actuator value associated with the actuator module 560 to achieve the target actuator value 540. In this manner, the actuator value is controlled based on the selected calibratable parameters 176.

Figure 8:
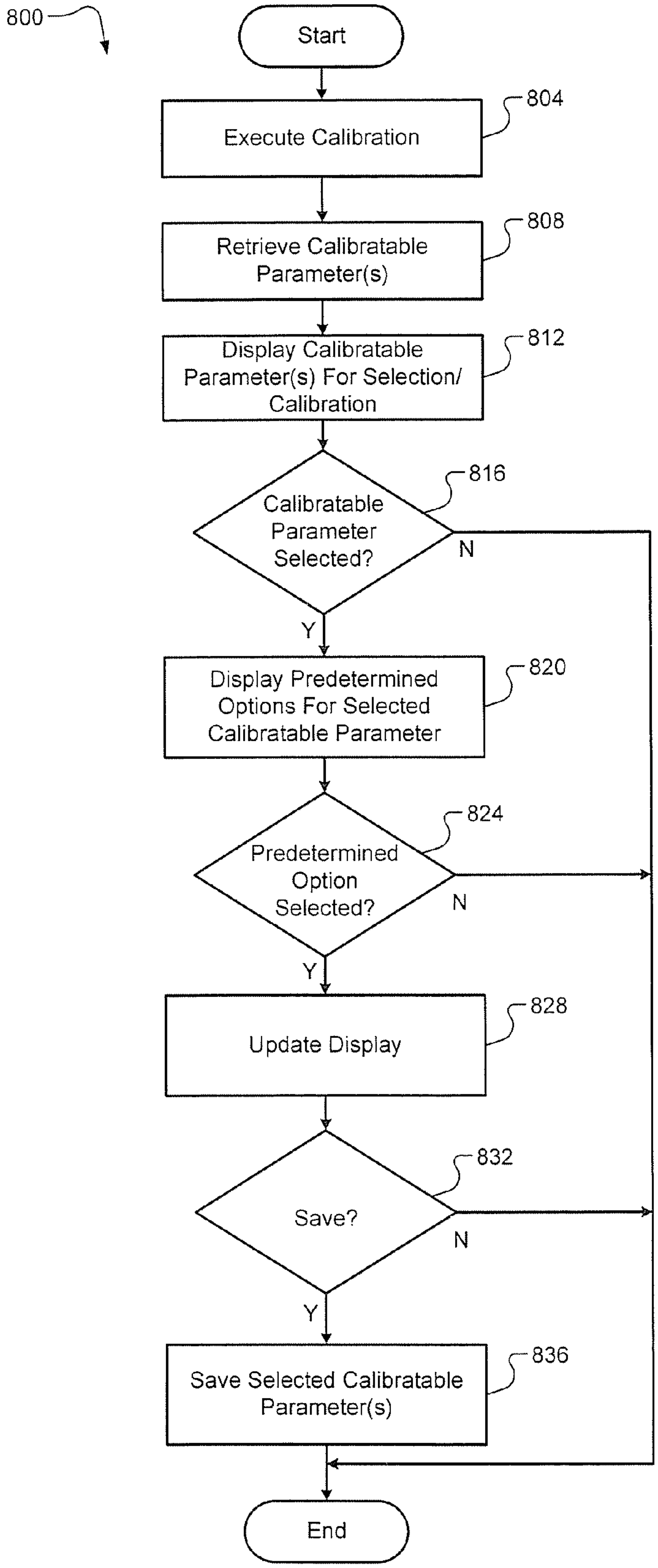
FIG. 8 is a flowchart of an exemplary method of calibrating one or more calibration parameters to be used in controlling a plant according to the principles of the present disclosure.

Referring now to FIG. 8, a flowchart depicting an exemplary method 800 of calibrating one or more of the calibratable parameters 164 to be used by the control module 102 in controlling an actuator of the plant 106 is presented. Control begins with 804 where control executes the calibration program via the host module 120.

At 808, control retrieves the calibratable parameters 164 from the control module 102. Control displays the calibratable parameters 164 for selection and calibration at 812. Control may display the calibratable parameters 164 in a predetermined format. For example only, control may display the calibratable parameters 164 in a format similar to that of the calibration GUI 400.

Control determines whether one of the calibratable parameters 164 has been selected at 816. If true, control proceeds with 820; if false, control may end. At 820, control displays the set of predetermined options for the selected one of the calibratable parameters 164. For example only, control may generate and display the set of predetermined options in a drop-down list. Control determines whether one of the predetermined options has been selected at 824. If true, control may proceed with 828; if false, control may end.

At 828, control may update the display to reflect the selected one of the predetermined options. Control may determine whether a save command has been input at 832. If true, control may save the selected calibratable parameters 176 (i.e., the calibratable parameters 164 selected by the calibrator) at 836 and control may end; if false, control may end. While control is shown and discussed as ending, it should be understood that control may not actually end.

Figure 9:
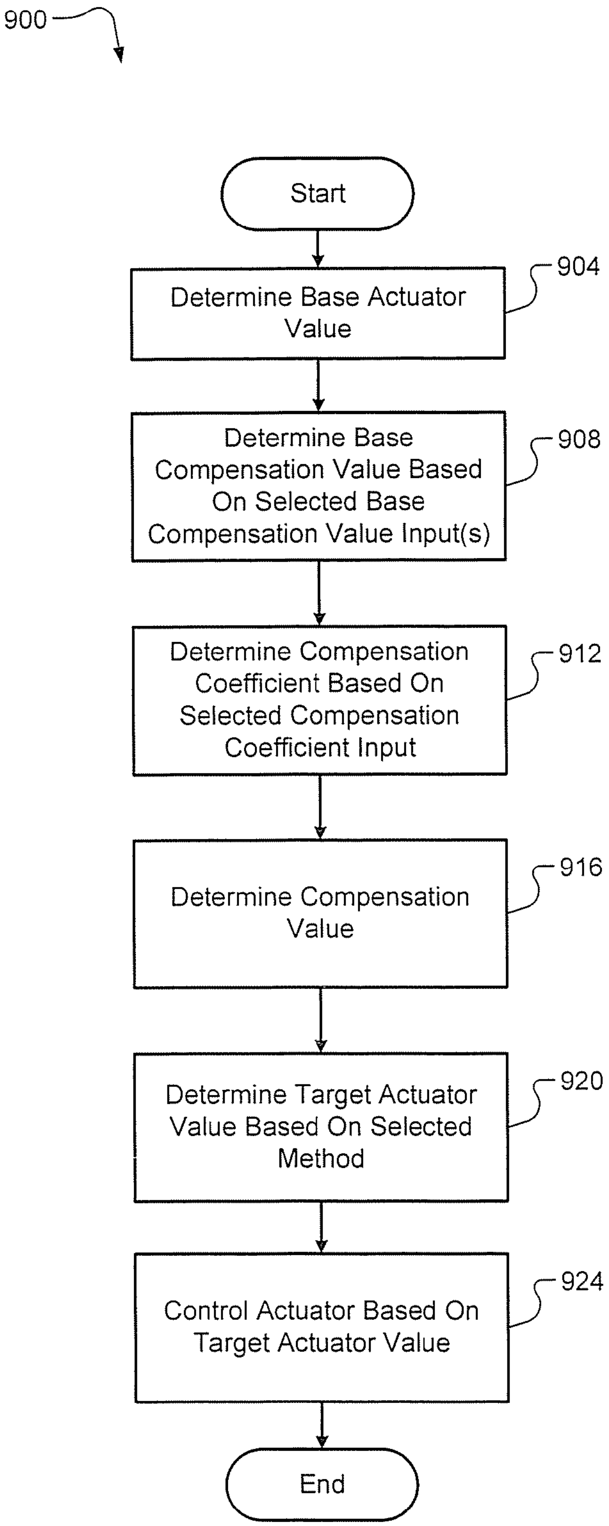
FIG. 9 is a flowchart of an exemplary method of determining a target actuator value based on one or more calibrated parameters and controlling an actuator based on the target actuator value according to the principles of the present disclosure.

Referring now to FIG. 9, a flowchart depicting an exemplary method 900 of determining the target actuator value 540 and controlling the actuator 560 of the plant 106 based on the target actuator value 540 is presented. Control begins with 904 where control determines the base actuator value 544. Control determines the base compensation value 620 based on the base compensation value inputs 624 at 908. Control determines the compensation coefficient 632 based on the compensation coefficient input 636 at 912.

At 916, control determines the compensation value 552 based on the product of the base compensation value 620 and the compensation coefficient 632. Control determines the target actuator value 540 based on the compensation value 552, the base actuator value 544, and the selected method 706 at 920. More specifically, control sets the target actuator value 540 equal to the sum of the compensation value 552 and the base actuator value 554 when the selected method 706 indicates addition. Control sets the target actuator value 540 equal to the product of the compensation value 552 and the base actuator value 554 when the selected method 706 indicates multiplication. Control controls the actuator 560 based on the target actuator value 540 at 924. Control may then end. While control is shown and discussed as ending, it should be understood that control may not actually end.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control module calibration system for a vehicle, comprising:

a control module of the vehicle that determines a base actuator value based on a base actuator value input, that determines a compensation value based on a compensation value input, that determines a target actuator value based on the base actuator value, the compensation value, and a function for determining the target actuator value based on the base actuator value and the compensation value, and that controls an actuator based on the target actuator value;

a calibration module that displays predetermined options for calibrating the function to a user and that selectively sets the function to a selected one of the predetermined options.

2. The control module calibration system of claim 1 wherein the predetermined options include addition and multiplication.

3. The control module calibration system of claim 1 wherein the control module determines a base compensation value based on a base compensation value input, determines a compensation coefficient based on a compensation coefficient input, and determines the compensation value based on the base compensation value and the compensation coefficient, and wherein the calibration module displays second predetermined options for calibrating the base compensation value input and selectively sets the base compensation value input to a selected one of the second predetermined options.

4. The control module calibration system of claim 3 wherein the control module sets the compensation value equal to a product of the base compensation value and the compensation coefficient.

5. The control module calibration system of claim 1 wherein the control module determines a base compensation value based on a base compensation value input, determines a compensation coefficient based on a compensation coefficient input, and determines the compensation value based on the base compensation value and the compensation coefficient, and wherein the calibration module displays second predetermined options for calibrating the base compensation value input, displays third predetermined options for calibrating the compensation coefficient input, and selectively sets the base compensation value input and the compensation coefficient input to selected ones of the second and third predetermined options, respectively.

6. The control module calibration system of claim 5 wherein the control module sets the compensation value equal to a product of the base compensation value and the compensation coefficient.

7. The control module calibration system of claim 1 wherein the control module sets the target actuator value equal to a product of the base actuator value and the compensation value when the selected one of the predetermined options is multiplication.

8. The control module calibration system of claim 1 wherein the control module sets the target actuator value equal to a sum of the base actuator value and the compensation value when the selected one of the predetermined options is addition.

9. A control module calibration system for a vehicle, comprising:

a base determination module that determines a base value based on a base value input;

a compensation determination module that determines a base compensation value based on a base value input;

a compensation coefficient determination module that determines a compensation coefficient based on a compensation coefficient input;

a multiplier module that determines a compensation value based on a product of the base compensation value and the compensation coefficient;

a target module that determines a target value based on the base value and the compensation value and that controls an actuator based on the target value; and a calibration module that selectively displays predetermined options for calibrating one of the base compensation value input and the compensation coefficient input and that sets the one of the base compensation value input and the compensation coefficient input to a selected one of the predetermined options.

10. The control module calibration system of claim 9 wherein the target module sets the target value equal to one of a sum of the base value and the compensation value and a product of the base value and the compensation value.

11. The control module calibration system of claim 9 wherein the target and base values are for one of an actuator and a parameter of an engine.

12. A control module calibration method comprising:

determining a base actuator value based on a base actuator value input using a control module;

determining a compensation value based on a compensation value input using the control module;

determining a target actuator value based on the base actuator value, the compensation value, and a function for determining the target actuator value based on the base actuator value and the compensation value using the control module;

controlling an actuator based on the target actuator value using the control module;

displaying predetermined options for calibrating the function to a user; and selectively setting the function to a selected one of the predetermined options.

13. The control module calibration method of claim 12 wherein the predetermined options include addition and multiplication.

14. The control module calibration method of claim 12 further comprising:

determining a base compensation value based on a base compensation value input using the control module;

determining a compensation coefficient based on a compensation coefficient input using the control module;

determining the compensation value based on the base compensation value and the compensation coefficient using the control module;

displaying second predetermined options for calibrating the base compensation value input; and selectively setting the base compensation value input to a selected one of the second predetermined options.

15. The control module calibration method of claim 14 further comprising setting the compensation value equal to a product of the base compensation value and the compensation coefficient using the control module.

16. The control module calibration method of claim 12 further comprising:

determining a base compensation value based on a base compensation value input using the control module;

determining a compensation coefficient based on a compensation coefficient input using the control module;

determining the compensation value based on the base compensation value and the compensation coefficient using the control module;

displaying second predetermined options for calibrating the base compensation value input;

displaying third predetermined options for calibrating the compensation coefficient input; and selectively setting the base compensation value input and the compensation coefficient input to selected ones of the second and third predetermined options, respectively.

17. The control module calibration method of claim 16 further comprising setting the compensation value equal to a product of the base compensation value and the compensation coefficient using the control module.

18. The control module calibration method of claim 12 further comprising setting the target actuator value equal to a product of the base actuator value and the compensation value using the control module when the selected one of the predetermined options is multiplication.

19. The control module calibration method of claim 12 further comprising setting the target actuator value equal to a sum of the base actuator value and the compensation value using the control module when the selected one of the predetermined options is addition.

* * * * *